(12) United States Patent
Donahoo

(10) Patent No.: US 7,258,129 B1
(45) Date of Patent: Aug. 21, 2007

(54) MOISTURE SENSOR AND CONTROL SYSTEM FOR SPRINKLERS AND METHOD THEREFOR

(76) Inventor: Michael J. Donahoo, 1279 Evening Canyon Ave., Henderson, NV (US) 89014

( * ) Notice: Subject to any disclaimer, the term of this patent is extended or adjusted under 35 U.S.C. 154(b) by 0 days.

(21) Appl. No.: 11/373,556

(22) Filed: Mar. 10, 2006

(51) Int. Cl.
*F16K 17/36* (2006.01)
(52) U.S. Cl. .......................... 137/78.3; 239/63; 73/73
(58) Field of Classification Search ............... 137/78.3; 239/64, 63; 73/73; 700/184
See application file for complete search history.

(56) References Cited

U.S. PATENT DOCUMENTS

| | | | | |
|---|---|---|---|---|
| 3,777,976 A | * | 12/1973 | Milovancevic | 137/78.3 |
| 4,333,490 A | * | 6/1982 | Enter, Sr. | 137/78.3 |
| 5,060,859 A | * | 10/1991 | Bancroft | 239/64 |
| 5,148,826 A | * | 9/1992 | Bakhshaei | 137/80 |
| 5,464,044 A | * | 11/1995 | Brinkerhoff | 137/78.3 |
| 5,647,388 A | * | 7/1997 | Butler et al. | 137/1 |
| 5,749,521 A | * | 5/1998 | Lattery | 239/64 |
| 6,123,093 A | * | 9/2000 | D'Antonio et al. | 137/78.3 |
| 7,063,271 B2 | * | 6/2006 | Lashgari | 239/64 |

* cited by examiner

*Primary Examiner*—Eric Keasel
*Assistant Examiner*—Cloud Lee
(74) *Attorney, Agent, or Firm*—Jeffrey D. Moy; Harry M. Weiss; Weiss & Moy, P.C.

(57) ABSTRACT

A landscaping watering system has a probe for monitoring a moisture content of an area. A control unit is coupled to the probe for sending an activation signal to activate a flow of water when a signal from the probe indicates the moisture content of the area is below a predefined level. The control unit sends a deactivation signal to stop a flow of water when a signal from the probe indicates the moisture content of the area is above a predefined level. A water solenoid valve is coupled to a water line, the control unit and to at least one sprinkler. The water solenoid valve will receive the activation and deactivation signals from the control unit to start and stop a flow of water from the water line to the at least one sprinkler.

8 Claims, 2 Drawing Sheets

MOISTURE SENSOR AND CONTROL SYSTEM FOR SPRINKLERS AND METHOD THEREFOR

FIELD OF THE INVENTION

The present invention relates to watering systems and, more specifically, to a lawn and plant watering system that controls the flow of water by monitoring the moisture content of the surrounding soil.

BACKGROUND OF THE INVENTION

Many residential and commercial sites use automatic watering systems to water the landscaping around the site. As used herein, "landscaping" means grass, plants, trees and other vegetation which may be planted around the site. The use of landscaping generally increases the value of the property. Hence, it is important to keep the landscaping nicely manicured.

Most sites generally use irrigation or a sprinkle system to water the surrounding landscaping. Conventional irrigation systems basically flood the area where the landscaping is located. Irrigation generally tends to over water the landscaping and thus waste water which may be used for other purposes. Thus, the cost to the consumer and the water supply may be substantial in areas that use irrigation systems.

Sprinkler systems generally rely on time of day controllers or manual controls that switch the sprinklers on and off. Manual controls are cumbersome since an individual must go to the controls and activate the sprinkler system every time one wishes to water the landscaping. The individual must then go back to the controls to deactivate the sprinkler systems once the landscaping is properly watered.

Time of day controllers also have problems. Time of day controllers will automatically activate the sprinkler system at a given time. Thus, even if the landscaping is already adequately watered, the time of day controller will automatically activate the sprinklers during that predetermined time frame. Thus, water is wasted which could be used for other purposes. This is especially problematic in areas where the weather is unpredictable and experience adequate rainfall to water the landscape. Unless one is available to manually turn off the time of day controller when it rains, the sprinkler system will water the landscaping during the rain storm, resulting in wasting of water.

Water management and conservation are a major concern these days. Builders are increasingly under pressure to build water-smart homes with irrigation/sprinkler systems designed to eliminate runoff potential, limit/minimize ornamental water features, install low water use landscaping, and incorporating irrigation/sprinkler systems that conserve water. Commercial sites are also required to audit and meet minimum water efficiency standards.

Therefore, there remains a need for a watering system that overcomes the above problems. The watering system must overcome the problems associated with prior art watering systems.

SUMMARY OF THE INVENTION

In accordance with one embodiment of the present invention, it is an object of the present invention to provide an improved watering system for landscaping.

It is another object of the present invention to provide an improved watering system that overcomes the problems associated with prior art watering systems.

BRIEF DESCRIPTION OF THE EMBODIMENTS

In accordance with one embodiment of the present invention a landscaping watering system is disclosed. The landscaping watering system has a probe for monitoring a moisture content of an area. A control unit is coupled to the probe for sending an activation signal to activate a flow of water when a signal from the probe indicates the moisture content of the area is below a predefined level. The control unit sends a deactivation signal to stop a flow of water when a signal from the probe indicates the moisture content of the area is above a predefined level. A water solenoid valve is coupled to a water line, the control unit and to at least one sprinkler. The water solenoid valve will receive the activation and deactivation signals from the control unit to start and stop a flow of water from the water line to the at least one sprinkler.

The present invention is best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
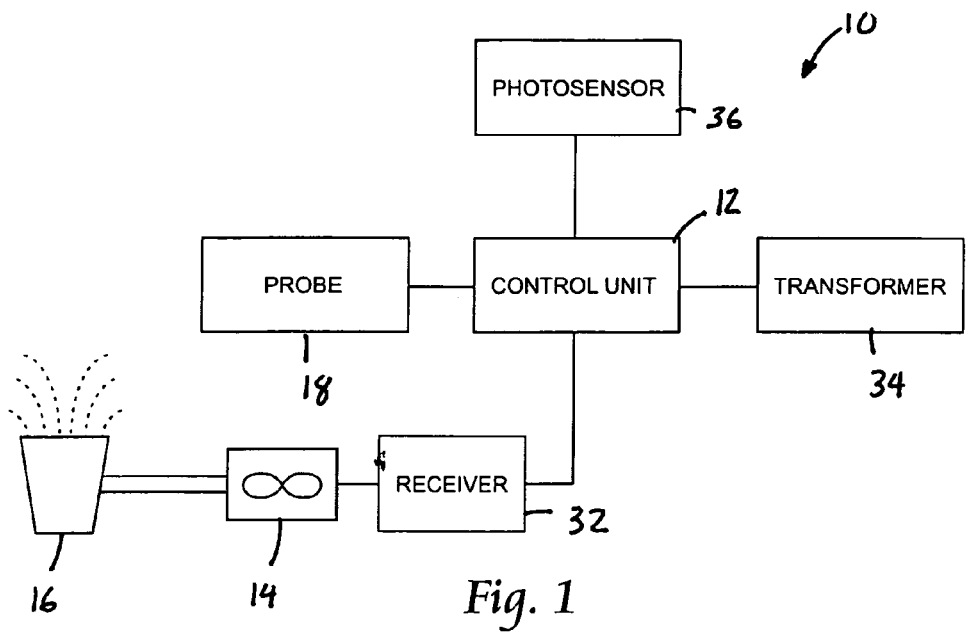
FIG. 1 is a simplified block diagram of the water control system of the present invention.
Figure 2:
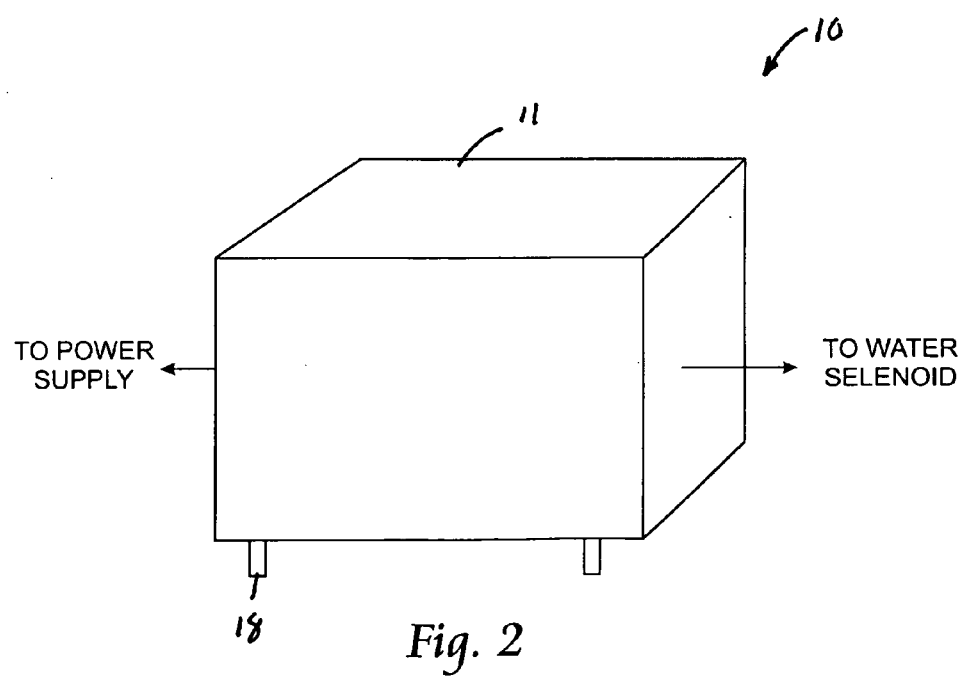
FIG. 2 is an elevated perspective view of the water control system of the present invention.
Figure 3:
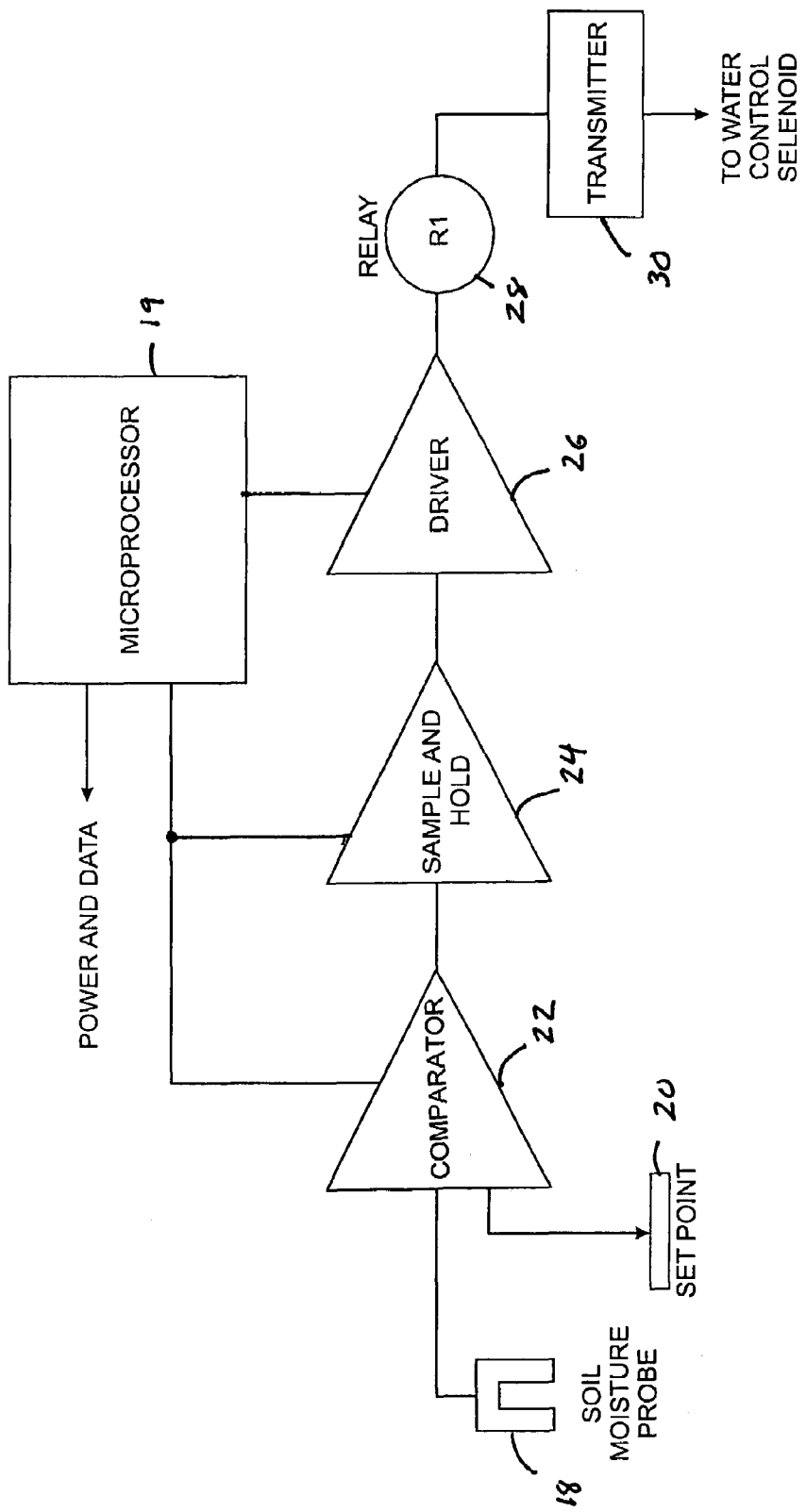
FIG. 3 is a simplified block diagram of the control unit used in the water control system of the present invention.

Referring to the Figures, a water control system 10 (hereinafter system 10) is shown. The system 10 controls the flow of water by monitoring the moisture content of the surrounding soil. When the soil is too dry, the system 10 will activate one or more sprinklers 16 to water the surrounding landscaping.

The system 10 has a main control unit 12. The control unit 12 will send a signal to a water solenoid valve 14 to active a flow of water to one or more sprinklers 16 when the control unit 12 monitors that the moisture level of the soil is below a predetermined set point. When the moisture level of the soil is at or above a predetermined level, the control unit 12 will send a signal to the water solenoid valve 14 to deactivate the flow of water to the sprinklers 16.

The control unit 12 has a processor 19. The processor 19 is used to control and program the control unit 12. The processor 19 is coupled to a comparator 22, sample and hold circuit 24, and driver 26 of the control unit 12.

The comparator 22 of the control unit 12 has one input coupled to a soil moisture probe 18. A second input of the comparator 22 is coupled to a set point 20. The comparator 22 will monitor a moisture signal received from the soil moisture probe 18 and compare the moisture signal to the set point 20. If the moisture signal is equal to or less than the signal from the set point 20, the comparator 22 will send an activation signal to activate the sprinklers 16. If the moisture signal is greater than the signal from the set point 20, the comparator 22 will send a deactivation signal to deactivate the sprinklers 16.

The output of the comparator 22 is coupled to a sample and hold circuit 24. The sample and hold circuit 24 is used to take a snapshot of the output signal from the comparator and to hold the value of the output signal. The sample and hold circuit 24 will sample the output signal once during a designated time frame and hold that value until a new sample is acquired.

The output of the sample and hold circuit 24 is then sent to a driver 26. The driver 26 is used to increase the signal strength of the output signal from the sample and hold circuit 24. The output of the driver 26 is then sent to a relay 28 which is used to control the water solenoid valve 14 to active and deactivate the flow of water to the one or more sprinklers 16.

In accordance with another embodiment of the present invention, the system 10 may have a wireless activation and deactivation circuit. The control unit 12 will have a wireless transmitter 30. The wireless transmitter 30 will send signals to a wireless receiver 32. The wireless receiver 32 is coupled to the water solenoid valve 14. The wireless transmitter 30 will send signals to the wireless receiver 32 to active and deactivate the flow of water to the one or more sprinklers 16 via the water solenoid valve 14.

The system 10 is coupled to a power supply. The power supply may be an AC or DC power source. In general, the system 10 will be coupled to a standard 110 volt electrical power supply. In order for a standard 110 volt electrical power source to be used, the system 10 will have a transformer 34. The transformer 34 will convert the power from the standard 110 volt electrical power supply to a level that may be used by the system 10.

The system 10 may further have a photo sensor 36. The photo sensor 36 is coupled to the control unit 12. The photo sensor 36 will only allow the control unit 12 to activate the sprinklers 16 once the photo sensor 36 monitors a low light level (i.e., after the sun sets). Thus, the system 10 will generally activate the sprinklers 16 during the twilight and evening hours. This will further conserve water since all of the water will be allowed to soak into the ground to water the vegetation instead of having the sun evaporate any standing water.

The control unit 12, transformer 34 and photo sensor 36 are generally stored in a housing 11. The housing 11 is a waterproof housing to protect the components of the system 10 from damage from the environment. The soil moisture probe 18 will extend down and out of the housing 11 so that the soil moisture probe may be inserted into the ground to measure the moisture of the ground.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A landscaping watering system comprising:
   a probe for monitoring a moisture content of an area of soil;
   a control unit coupled to the probe for sending an activation signal to activate a flow of water when a signal from the probe indicates the moisture content of the area of soil is below a predefined level and for sending a deactivation signal to stop a flow of water when a signal from the probe indicates the moisture content of the area is above a predefined level, wherein the control unit comprises:
   a comparator having a first input coupled to the probe and a second input coupled to a set point;
   a sample and hold circuit having an input coupled to an output of the comparator;
   a driver having an input coupled to the output of the sample and hold circuit and an output coupled to the relay for increasing a strength of an output signal from the sample and hold circuit;
   a relay coupled to the water solenoid valve; and
   a processor coupled to the comparator, the sample and hold circuit, and the driver for programming the control unit; and
   a water solenoid valve couple to a water line, the control unit and to at least one sprinkler for receiving the activation and deactivation signals from the control unit to start and stop a flow of water from the water line to the at least one sprinkler.

2. A landscaping watering system in accordance with claim 1 further comprising a photo sensor coupled to the control unit to allow activation of the landscaping watering system when a light level is below a predefined level.

3. A landscaping watering system in accordance with claim 1 further comprising:
   wireless transmitter coupled to the control unit for in wirelessly transmitting the activation signal and deactivation signals; and
   wireless receiver coupled to the water solenoid valve and in wireless communication with the wireless transmitter for receiving the activation and deactivation signals from the wireless transmitter.

4. A landscaping watering system in accordance with claim 1 further comprising a waterproof housing for protecting the control unit from the environment.

5. A landscaping watering system in accordance with claim 1 further comprising a transformer coupled to the control unit.

6. A landscaping watering system comprising:
   a probe for monitoring a moisture content of an area;
   a control unit coupled to the probe for sending an activation signal to activate a flow of water when a signal from the probe indicates the moisture content of the area is below a predefined level and for sending a deactivation signal to stop a flow of water when a signal from the probe indicates the moisture content of the area is above a predefined level, wherein the control unit comprises:
   a comparator having a first input coupled to the probe and a second input coupled to a set point;
   a sample and hold circuit having an input coupled to an output of the comparator;
   a driver having an input coupled to the output of the sample and hold circuit and an output coupled to the relay for increasing a strength of an output signal from the sample and hold circuit; and
   a relay coupled to the water solenoid valve; and
   a water solenoid valve couple to a water line, the control unit and to at least one sprinkler for receiving the activation and deactivation signals from the control unit to start and stop a flow of water from the water line to the at least one sprinkler;
   a photo sensor coupled to the control unit to allow activation of the landscaping watering system when a light level is below a predefined level; and
   a transformer coupled to the control unit; and
   a waterproof housing for protecting the control unit and transformer from the environment, the probe and the photo sensor extending out of the housing.

7. A landscaping watering system in accordance with claim 6 wherein the control unit further comprises a processor for programming the control unit.

8. A landscaping watering system in accordance with claim 6 further comprising:
- a wireless transmitter coupled to the control unit for wirelessly transmitting the activation signal and deactivation signals; and
- a wireless receiver coupled to the water solenoid valve and in wireless communication with the wireless transmitter for receiving the activation and deactivation signals from the wireless transmitter.

* * * * *